US009207984B2

(12) United States Patent
Sivasubramanian et al.

(10) Patent No.: US 9,207,984 B2
(45) Date of Patent: Dec. 8, 2015

(54) MONITORING AND AUTOMATIC SCALING OF DATA VOLUMES

(75) Inventors: Swaminathan Sivasubramanian, Seattle, WA (US); Grant Alexander MacDonald McAlister, Seattle, WA (US); Milovan Milovanovic, Alexandria, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/415,998

(22) Filed: Mar. 31, 2009

(65) Prior Publication Data

US 2010/0250748 A1  Sep. 30, 2010

(51) Int. Cl.
*G06F 15/16* (2006.01)
*G06F 9/50* (2006.01)
*G06F 11/34* (2006.01)

(52) U.S. Cl.
CPC .......... *G06F 9/5016* (2013.01); *G06F 11/3409* (2013.01); *G06F 11/3442* (2013.01); *G06F 2201/81* (2013.01); *G06F 2201/815* (2013.01); *G06F 2201/875* (2013.01); *G06F 2201/88* (2013.01)

(58) Field of Classification Search
CPC ....... H04L 47/10; H04L 45/00; H04L 45/586; H04L 45/50; H04L 29/06612; H04L 12/2424; G06F 3/00; G06F 3/06; G06F 3/01; G06F 3/061
USPC ......................................................... 709/226
See application file for complete search history.

(56) References Cited

U.S. PATENT DOCUMENTS

| 5,263,165 | A | 11/1993 | Janis |
| 5,555,404 | A | 9/1996 | Torbjørnsen et al. |
| 6,018,746 | A | 1/2000 | Hill et al. |
| 6,205,465 | B1 * | 3/2001 | Schoening et al. ........... 718/102 |
| 6,442,707 | B1 | 8/2002 | McGrath et al. |
| 6,542,907 | B1 | 4/2003 | Cohen |

(Continued)

FOREIGN PATENT DOCUMENTS

| CN | 1573753 | 2/2005 |
| CN | 101099172 | 1/2008 |

(Continued)

OTHER PUBLICATIONS

'Unix/Linux Administration Logical Volume Management Guide (2005) to Pollock. ("Pollock").*

(Continued)

*Primary Examiner* — June Sison
(74) *Attorney, Agent, or Firm* — Novak Druce Connolly Bove + Quigg LLP

(57) ABSTRACT

Aspects of a data environment, such as various capacities of data stores and instances, can be managed using a separate control environment. A monitoring component of the control environment can periodically communicate with the data environment to obtain performance information. The information is analyzed, using algorithms such as trending and extrapolation algorithms, to determine any recommended scaling of resources in the data environment. The scaling can be performed automatically, or as authorized by a customer. A workflow can be instantiated that includes tasks necessary to perform the scaling. The scaling of storage capacity can be performed without affecting the availability of the data store.

23 Claims, 6 Drawing Sheets

(56) References Cited

U.S. PATENT DOCUMENTS

| | | |
|---|---|---|
| 6,560,639 B1 | 5/2003 | Dan et al. |
| 6,611,867 B1* | 8/2003 | Bowman-Amuah .......... 709/224 |
| 6,671,821 B1 | 12/2003 | Castro et al. |
| 6,675,299 B2 | 1/2004 | Porter et al. |
| 6,961,766 B2 | 11/2005 | Janosik, Jr. et al. |
| 6,961,768 B2 | 11/2005 | Davis et al. |
| 6,981,135 B1 | 12/2005 | Trask |
| 6,985,955 B2* | 1/2006 | Gullotta et al. ............... 709/229 |
| 6,988,139 B1 | 1/2006 | Jervis et al. |
| 7,062,559 B2* | 6/2006 | Yoshimura et al. ........... 709/226 |
| 7,065,624 B1* | 6/2006 | Zahavi ........................... 711/170 |
| 7,124,289 B1 | 10/2006 | Suorsa |
| 7,133,907 B2 | 11/2006 | Carlson et al. |
| 7,315,826 B1 | 1/2008 | Guheen et al. |
| 7,415,484 B1 | 8/2008 | Tulkoff et al. |
| 7,418,484 B2 | 8/2008 | Presley |
| 7,478,263 B1 | 1/2009 | Kownacki et al. |
| 7,502,329 B2 | 3/2009 | Li et al. |
| 7,506,021 B2 | 3/2009 | Polan et al. |
| 7,536,686 B2 | 5/2009 | Tan et al. |
| 7,624,133 B1 | 11/2009 | Ojalvo |
| 7,680,771 B2 | 3/2010 | Cialini et al. |
| 7,769,721 B2 | 8/2010 | Ueoka et al. |
| 7,801,932 B2 | 9/2010 | Krishnaswamy |
| 7,827,547 B1 | 11/2010 | Sutherland et al. |
| 7,966,528 B2 | 6/2011 | Troppmann et al. |
| 7,991,749 B2 | 8/2011 | Nishikawa et al. |
| 8,020,037 B1 | 9/2011 | Schwartz et al. |
| 8,041,679 B1 | 10/2011 | Narayanan |
| 8,078,587 B2 | 12/2011 | Wahlert et al. |
| 8,121,981 B2 | 2/2012 | Simek et al. |
| 8,150,808 B2 | 4/2012 | Zha et al. |
| 8,150,904 B2 | 4/2012 | Queck et al. |
| 8,156,082 B2 | 4/2012 | Srivastava et al. |
| 8,307,003 B1 | 11/2012 | Gangadhar et al. |
| 8,352,608 B1* | 1/2013 | Keagy et al. .................. 709/226 |
| 8,364,460 B2* | 1/2013 | Ostermeyer et al. ............. 703/22 |
| 8,392,915 B2* | 3/2013 | Friedman et al. .................. 718/1 |
| 2001/0007133 A1 | 7/2001 | Moriconi et al. |
| 2002/0001984 A1 | 1/2002 | Franzen et al. |
| 2002/0019844 A1 | 2/2002 | Kurowski et al. |
| 2002/0032883 A1 | 3/2002 | Kampe et al. |
| 2002/0147709 A1 | 10/2002 | Rajarajan et al. |
| 2003/0005091 A1 | 1/2003 | Ullmann et al. |
| 2003/0023811 A1* | 1/2003 | Kim et al. ..................... 711/114 |
| 2003/0212775 A1* | 11/2003 | Steele et al. .................. 709/223 |
| 2003/0212898 A1* | 11/2003 | Steele et al. .................. 713/200 |
| 2004/0015668 A1* | 1/2004 | McBrearty et al. ............ 711/163 |
| 2004/0073676 A1 | 4/2004 | Honma et al. |
| 2004/0078637 A1 | 4/2004 | Fellin et al. |
| 2004/0148443 A1 | 7/2004 | Achiwa |
| 2004/0163008 A1 | 8/2004 | Kim |
| 2004/0174823 A1* | 9/2004 | Steele et al. ................... 370/252 |
| 2004/0225659 A1* | 11/2004 | O'Brien et al. .................... 707/9 |
| 2004/0267835 A1 | 12/2004 | Zwilling et al. |
| 2005/0004999 A1 | 1/2005 | Moore et al. |
| 2005/0027845 A1 | 2/2005 | Secor et al. |
| 2005/0038831 A1 | 2/2005 | Souder et al. |
| 2005/0193245 A1 | 9/2005 | Hayden et al. |
| 2005/0210128 A1 | 9/2005 | Cannon et al. |
| 2005/0216788 A1 | 9/2005 | Mani-Meitav et al. |
| 2005/0243611 A1 | 11/2005 | Lubbers et al. |
| 2005/0262164 A1 | 11/2005 | Guiheneuf et al. |
| 2005/0283655 A1 | 12/2005 | Ashmore |
| 2005/0289310 A1 | 12/2005 | Miki |
| 2006/0036761 A1 | 2/2006 | Amra et al. |
| 2006/0041641 A1 | 2/2006 | Breiter et al. |
| 2006/0053251 A1* | 3/2006 | Nicholson et al. ............ 711/114 |
| 2006/0104231 A1* | 5/2006 | Gidwani ........................ 370/328 |
| 2006/0106675 A1 | 5/2006 | Cohen et al. |
| 2006/0106774 A1 | 5/2006 | Cohen et al. |
| 2007/0022122 A1 | 1/2007 | Bahar et al. |
| 2007/0050538 A1* | 3/2007 | Northcutt et al. ............. 711/112 |
| 2007/0061266 A1 | 3/2007 | Moore et al. |
| 2007/0061487 A1 | 3/2007 | Moore et al. |
| 2007/0078982 A1 | 4/2007 | Aidun et al. |
| 2007/0083588 A1* | 4/2007 | Keller et al. .................. 709/202 |
| 2007/0156842 A1 | 7/2007 | Vermeulen et al. |
| 2007/0156872 A1 | 7/2007 | Stoyanova |
| 2007/0162420 A1 | 7/2007 | Ou et al. |
| 2007/0174691 A1 | 7/2007 | D'Souza et al. |
| 2007/0192329 A1* | 8/2007 | Croft et al. ....................... 707/10 |
| 2007/0234028 A1 | 10/2007 | Rothman et al. |
| 2007/0234111 A1* | 10/2007 | Soran et al. ........................ 714/7 |
| 2007/0234115 A1 | 10/2007 | Saika |
| 2007/0239944 A1* | 10/2007 | Rupanagunta et al. ........ 711/147 |
| 2007/0244996 A1 | 10/2007 | Ahmed et al. |
| 2007/0248017 A1* | 10/2007 | Hinata et al. .................. 370/238 |
| 2007/0260693 A1 | 11/2007 | Cardone et al. |
| 2007/0260696 A1 | 11/2007 | Bohannon et al. |
| 2007/0260912 A1 | 11/2007 | Hatasaki et al. |
| 2007/0271275 A1 | 11/2007 | Fassette et al. |
| 2007/0283443 A1 | 12/2007 | McPherson et al. |
| 2007/0288526 A1 | 12/2007 | Mankad et al. |
| 2007/0299828 A1 | 12/2007 | Lewis et al. |
| 2008/0010513 A1 | 1/2008 | Devarakonda et al. |
| 2008/0016293 A1* | 1/2008 | Saika ............................ 711/154 |
| 2008/0040509 A1 | 2/2008 | Werb et al. |
| 2008/0052327 A1 | 2/2008 | Buah et al. |
| 2008/0065650 A1 | 3/2008 | Kim et al. |
| 2008/0109448 A1 | 5/2008 | Aboel-Nil et al. |
| 2008/0126734 A1* | 5/2008 | Murase ......................... 711/170 |
| 2008/0134176 A1 | 6/2008 | Fitzgerald et al. |
| 2008/0134178 A1 | 6/2008 | Fitzgerald et al. |
| 2008/0162590 A1 | 7/2008 | Kundu et al. |
| 2008/0183991 A1 | 7/2008 | Cosmadopoulos et al. |
| 2008/0189413 A1 | 8/2008 | Srivastava et al. |
| 2008/0189769 A1* | 8/2008 | Casado et al. ..................... 726/4 |
| 2008/0195622 A1 | 8/2008 | Lelcuk et al. |
| 2008/0244579 A1 | 10/2008 | Muller |
| 2008/0256384 A1 | 10/2008 | Branson et al. |
| 2008/0263388 A1 | 10/2008 | Allen et al. |
| 2008/0301663 A1 | 12/2008 | Bahat et al. |
| 2009/0006888 A1 | 1/2009 | Bernhard et al. |
| 2009/0019137 A1 | 1/2009 | Mishra et al. |
| 2009/0019535 A1 | 1/2009 | Mishra et al. |
| 2009/0037425 A1 | 2/2009 | Erickson et al. |
| 2009/0063509 A1 | 3/2009 | Lockhart et al. |
| 2009/0063563 A1 | 3/2009 | Khangaonkar et al. |
| 2009/0106411 A1 | 4/2009 | Lisiecki et al. |
| 2009/0106441 A1 | 4/2009 | Zuckerman et al. |
| 2009/0138577 A1* | 5/2009 | Casado et al. ................. 709/220 |
| 2009/0164853 A1 | 6/2009 | Gokhale et al. |
| 2009/0198940 A1* | 8/2009 | Ash et al. ...................... 711/165 |
| 2009/0216881 A1 | 8/2009 | Lovy et al. |
| 2009/0271656 A1 | 10/2009 | Yokota et al. |
| 2009/0300093 A1 | 12/2009 | Griffiths et al. |
| 2009/0328065 A1* | 12/2009 | Wookey ........................ 719/315 |
| 2010/0005531 A1 | 1/2010 | Largman et al. |
| 2010/0036851 A1 | 2/2010 | Paterson-Jones et al. |
| 2010/0077160 A1 | 3/2010 | Liu et al. |
| 2010/0125555 A1 | 5/2010 | Lau et al. |
| 2010/0169707 A1 | 7/2010 | Mathew et al. |
| 2010/0191713 A1* | 7/2010 | Lomet et al. .................. 707/704 |
| 2010/0198972 A1* | 8/2010 | Umbehocker ................ 709/226 |
| 2010/0211548 A1 | 8/2010 | Ott et al. |
| 2010/0250499 A1 | 9/2010 | McAlister et al. |
| 2010/0250748 A1 | 9/2010 | Sivasubramanian et al. |
| 2010/0251002 A1 | 9/2010 | Sivasubramanian et al. |
| 2010/0251242 A1 | 9/2010 | Sivasubramanian et al. |
| 2010/0251339 A1 | 9/2010 | McAlister |
| 2010/0262650 A1* | 10/2010 | Chauhan et al. .............. 709/203 |
| 2011/0004457 A1 | 1/2011 | Haviv et al. |
| 2011/0004916 A1* | 1/2011 | Schiffman et al. ................ 726/1 |
| 2011/0083138 A1 | 4/2011 | Sivasubramanian et al. |
| 2011/0099146 A1 | 4/2011 | McAlister et al. |
| 2011/0099147 A1 | 4/2011 | McAlister et al. |
| 2011/0099420 A1 | 4/2011 | McAlister et al. |
| 2011/0178793 A1 | 7/2011 | Giffin et al. |
| 2011/0288847 A1* | 11/2011 | Narayanan et al. ............. 703/19 |

(56) References Cited

U.S. PATENT DOCUMENTS

FOREIGN PATENT DOCUMENTS

| | | |
|---|---|---|
| CN | 101501668 | 8/2009 |
| CN | 101512507 | 8/2009 |
| CN | 101539841 | 9/2009 |
| JP | 10-312327 A | 11/1998 |
| JP | 2000172721 | 6/2000 |
| JP | 2001518663 | 10/2001 |
| JP | 2003330781 | 11/2003 |
| JP | 2004206694 | 7/2004 |
| JP | 2004362596 | 12/2004 |
| JP | 2005-267056 A | 9/2005 |
| JP | 2006-011874 A | 1/2006 |
| JP | 2006048676 | 2/2006 |
| JP | 2007516510 | 6/2007 |
| JP | 2008141339 | 6/2008 |
| JP | 2009522659 | 6/2009 |
| JP | 2009522660 | 6/2009 |
| JP | 2009-230742 A | 10/2009 |
| WO | 2008058230 | 5/2008 |

OTHER PUBLICATIONS

IBM Redbook: SAN Volume Controller: Best Practices and Performance Guidelines (draft), Tate et.al. (Jul. 2007).*
z/VM and Linx on IBM system z—The virtualization Cookbook for Red Hat Enterprise Linux 5.2, MacIsaac et. al. (Oct. 2008).*
U.S. Appl. No. 12/418,475, filed Apr. 3, 2009, Sheth.
International Search Report mailed on May 25, 2010 for International Application No. PCT/US10/029476 filed on Mar. 31, 2010, 2 pages.
International Search Report mailed on Dec. 2, 2010 for International Application No. PCT/US10/051757 filed on Oct. 7, 2010, 2 pages.
International Search Report mailed on Dec. 21, 2010 for International Application No. PCT/US10/54139 filed on Oct. 26, 2010, 2 pages.
International Search Report mailed on Dec. 23, 2010 for International Application No. PCT/US10/54133 filed on Oct. 26, 2010, 2 pages.
International Search Report mailed on Dec. 21, 2010 for International Application No. PCT/US10/54141 filed on Oct. 26, 2010, 2 pages.
U.S. Appl. No. 12/418,476, filed Apr. 3, 2009, Sheth.
International Search Report mailed on Dec. 21, 2010 for International Application No. PCT/US10/54133 filed on Oct. 26, 2010, 2 pages.
James R. Cordy, Practical Langauage-Independent Detection of Near-Miss Clones, ACM, 2004, 12 pages, <URL: http://delivery.acm.org/10.1145/104000/1034915/p1-cordy.pdf>.
Yi Wang, Virtual Routers on the Move: Live Router Migration as a Network-Management Primitive, ACM, 2008, 12 pages, <URL:http://delivery.acm.org/10.1145/1410000/1142512/p337-lomet.pdf>.
David Lomet, Recovery from "Bad" User Transactions, ACM, 2006, 10 pages, <URL:http://delivery.acm.org/10.1145/1150000/11142512/p337-lomet.pdf>.
Sanjay Ghemawat, The Google File System, ACM, 2003, 15 pages, <URL:http://delivery.acm.org/10.1145/1150000/1142512/p337-lomet.pdf>.
Brett Battles, Reducing Data Center Power Consumption Through Efficient Storage, Google Scholar, 2007, 9 pages, <URL:http://www.it-executive.nl/images/downloads/reducing-datacert-power.pdf>.
Tirthankar Lahiri, Cache Fusion: Extending Shared-Disk Clusters with Shared Caches, Google Scholar, 2001, 4 pages, < URL:http://www.vldb.org/conf/2001/P683.pdf>.
Ralph Mietzner & Frank Leymann, "Towards Provisioning the Cloud: On the Usage of Multi-Granularity Flows and Services to Realize a Unified Provisioning Infrastructure for Saas Applications," 2008 IEEE Congress on Services-Part 1, pp. 3-10.
"Oracle9i SQL Reference," Oct. 2002, Oracle Corporation, pp. 1-1 to 1-3.
"Examination Report dated Oct. 19, 2012", Singapore Application 201202870-0, Oct. 19, 2012, 8 pages.
"Examination Report dated Oct. 29, 2012", Singapore Application 201202868-4, Oct. 29, 2012, 5 pages.
"Examination Report dated Oct. 9, 2012", Singapore Application 201107040-6, Oct. 9, 2012, 5 pages.
"Examination Report dated Dec. 11, 2012", Singapore Application 201202502-9, Dec. 11, 2012, 8 pages.
"Examination Report dated May 17, 2013", Singapore Application 201202967-4, May 17, 2013, 10 pages.
"Extended European Search Report dated Sep. 19, 2013", Europe Application 10827392.1, Sep. 19, 2013, 6 pages.
"Final Office Action dated Oct. 14, 2011", U.S. Appl. No. 12/415,958, Oct. 14, 2011, 34 pages.
"Final Office Action dated Oct. 16, 2012", U.S. Appl. No. 12/575,381, Oct. 16, 2012, 42 pages.
"Final Office Action dated Oct. 19, 2011", U.S. Appl. No. 12/418,475, Oct. 19, 2011, 26 pages.
"Final Office Action dated Nov. 1, 2012", U.S. Appl. No. 12/606,106, Nov. 1, 2012, 29 pages.
"Final Office Action dated Dec. 19, 2011", U.S. Appl. No. 12/415,968, Dec. 19, 2011.
"Final Office Action dated Feb. 22, 2013", U.S. Appl. No. 13/294,099, Feb. 22, 2013.
"Final Office Action dated May 8, 2013", U.S. Appl. No. 12/416,017, May 8, 2013.
"Non Final Office Action dated Jan. 2, 2013", U.S. Appl. No. 13/620,962, Jan. 2, 2013.
"Non Final Office Action dated Dec. 14, 2010", U.S. Appl. No. 12/415,987, Dec. 14, 2010.
"Non Final Office Action dated Feb. 14, 2011", U.S. Appl. No. 12/606,097, Feb. 14, 2011.
"Non Final Office Action dated Mar. 14, 2012", U.S. Appl. No. 12/606,093, Mar. 14, 2012, 24 pages.
"Non Final Office Action dated Mar. 18, 2013", U.S. Appl. No. 13/299,601, Mar. 18, 2013.
"Non Final Office Action dated Apr. 18, 2012", U.S. Appl. No. 12/575,381, Apr. 18, 2012, 31 pages.
"Non Final Office Action dated Apr. 29, 2011", U.S. Appl. No. 12/415,968, Apr. 29, 2011, 30 pages.
"Non Final Office Action dated May 2, 2011", U.S. Appl. No. 12/418,475, May 2, 2011, 20 pages.
"Non Final Office Action dated May 2, 2011", U.S. Appl. No. 12/415,958, May 2, 2011, 23 pages.
"Non Final Office Action dated May 28, 2013", U.S. Appl. No. 12/606,106, May 28, 2013.
"Non Final Office Action dated May 31, 2012", U.S. Appl. No. 12/606,106, May 31, 2012, 29 pages.
"Non Final Office Action dated Jun. 20, 2013", U.S. Appl. No. 13/620,999, Jun. 20, 2013.
"Non Final Office Action dated Jun. 20, 2013", U.S. Appl. No. 13/621,073, Jun. 20, 2013.
"Non Final Office Action dated Aug. 19, 2011", U.S. Appl. No. 12/416,017, Aug. 19, 2011.
"Non Final Office Action dated Sep. 13, 2012", U.S. Appl. No. 13/294,099, Sep. 13, 2012.
"Non Final Office Action dated Sep. 14, 2012", U.S. Appl. No. 13/299,601, Sep. 14, 2012, 15 pages.
"Notice of Allowance dated Oct. 24, 2012", U.S. Appl. No. 12/606,093, Oct. 24, 2012, 13 pages.
"Notice of Allowance dated Nov. 13, 2012", U.S. Appl. No. 12/415,968, Nov. 13, 2012.
"Notice of Allowance dated Mar. 16, 2012", U.S. Appl. No. 12/418,475, Mar. 16, 2012, 11 pages.
"Notice of Allowance dated Mar. 9, 2012", U.S. Appl. No. 12/415,958, Mar. 9, 2012, 29 pages.
"Notice of Allowance dated Apr. 15, 2011", U.S. Appl. No. 12/415,987, Apr. 15, 2011.
"Notice of Allowance dated Apr. 18, 2013", U.S. Appl. No. 13/620,962, Apr. 18, 2013.

(56) References Cited

OTHER PUBLICATIONS

"Notice of Allowance dated Jun. 1, 2012", U.S. Appl. No. 12/415,968, Jun. 1, 2012.
"Notice of Allowance dated Jun. 26, 2012", U.S. Appl. No. 12/606,093, Jun. 26, 2012, 8 pages.
"Notice of Allowance dated Jun. 28, 2012", U.S. Appl. No. 12/418,475, Jun. 28, 2012, 20 pages.
"Notice of Allowance dated Jul. 12, 2011", U.S. Appl. No. 12/606,097, Jul. 12, 2011.
"Notice of Allowance dated Jul. 5, 2012", U.S. Appl. No. 12/415,958, Jul. 5, 2012, 14 pages.
"Notice of Allowance dated Jul. 9, 2013", Japan Application 2012-533307, Jul. 9, 2013.
"Notice of Allowance dated Aug. 12, 2013", U.S. Appl. No. 13/299,601, Aug. 12, 2013.
"Notice of Allowance dated Aug. 26, 2013", U.S. Appl. No. 13/620,962, Aug. 26, 2013.
"Notice of Allowance dated Aug. 8, 2011", U.S. Appl. No. 12/415,987, Aug. 8, 2011.
"Written Opinion dated Oct. 2, 2012", Singapore Application 201202967-4, Oct. 2, 2012, 14 pages.
"Written Opinion dated Feb. 15, 2012", Singapore Application 201107040-6, Feb. 15, 2012, 6 pages.
"Notice of Allowance dated Nov. 13, 2013", U.S. Appl. No. 12/606,106.
"Notice of Allowance dated Nov. 19, 2013", Japan Application 2012-536964.
"Notice of Allowance dated Nov. 19, 2013", Japan Application 2012-536966.
"Notice of Allowance dated Nov. 20, 2013", U.S. Appl. No. 12/606,106.
"Notice of Allowance dated Dec. 26, 2013", U.S. Appl. No. 12/415,958.
"Notice of Allowance dated Dec. 30, 2013", U.S. Appl. No. 13/620,999.
"Notice of Allowance dated Dec. 30, 2013", U.S. Appl. No. 13/621,073.
"Supplemental Notice of Allowance dated Oct. 25, 2013", U.S. Appl. No. 13/294,099.
Non-Final Office Action mailed Apr. 9. 2014; in corresponding U.S. Appl. No. 12/416,017.
English translation of the Notice of the First Office Action mailed Apr. 1, 2014; in corresponding Chinese patent application No. 201080053676.7.
Notice of the First Office Action mailed May 5, 2014; in corresponding Chinese patent application No. 201080056311.X.
Notice of the First Office Action mailed Apr. 21, 2014; in corresponding Chinese patent application No. 201080056327.0.
Non-Final Office Action mailed Jul. 30, 2014; in corresponding U.S. Appl. No. 12/575,381.
Notice of the First Office Action mailed Jun. 12, 2014; in corresponding Chinese patent application No. 201080049395.4.
Office Action mailed Apr. 14, 2014; in corresponding Canadian patent application No. 2,776,384.
Office Action mailed Apr. 3, 2014; in corresponding Canadian patent application No. 2,778,110.
English abstract for CN101501668; published on Aug. 5, 2009 and retrieved on Oct. 8, 2014.
Examination Report mailed Oct. 31, 2012; in corresponding Singaporean patent application No. 201202502-9.
Examination Report mailed Sep. 13, 2013; in corresponding Singaporean patent application No. 201202868-4.
Examination Report mailed Sep. 21, 2012; in corresponding Singaporean patent application No. 201202870-0.
Invitation to Respond to Written Opinion mailed Sep. 14, 2012; in corresponding Singaporean patent application No. 201202967-4.
Examination Report mailed Oct. 30, 2012; in corresponding Singaporean patent application No. 201107040-6.
Non-Final Office Action mailed May 7, 2014; in corresponding U.S. Appl. No. 13/621,044.
English abstract for CN101539841; published on Sep. 23, 2009 and retrieved on Oct. 14, 2014.
Office Action mailed Apr. 3, 2014; in corresponding Canadian patent application No. 2778110.
English translation of the Notice on the First Office Action mailed May 5, 2014; in corresponding Chinese patent application No. 201080056311.X.
Notice of the First Office Action mailed Apr. 1, 2014; in corresponding Chinese patent application No. 201080053676.7.
Office Action mailed Jul. 25, 2014; in corresponding Canadian patent application No. 2,778,723.
English translation of the Notice of the First Office Action mailed Jun. 12, 2014; in corresponding Chinese patent application No. 201080049395.4.
Written Opinion mailed Feb. 15, 2012; in corresponding Singapore application No. 201107040-6.
Office Action mailed Dec. 3, 2013; in corresponding Japanese patent application No. 2012503674.
English abstract for CN101512507; published on Aug. 19, 2009 and retrieved on Oct. 14, 2014.
English abstract for CN1573753; published on Feb. 2, 2005 and retrieved on Oct. 14, 2014.
English abstract for JP2006048676; published on Feb. 16, 2006 and retrieved on Oct. 13, 2014.
Corrected Notice of Allowability Nov. 13, 2012; in corresponding U.S. Appl. No. 12/415,958.
English abstract for CN101099172; published on Jan. 2, 2008.
English abstract for JP2007516510; published on Jun. 21, 2007 and retrieved on Oct. 14, 2014.
English abstract for JP2001518663; published on Oct. 16, 2001 and retrieved on Oct. 14, 2014.
English abstract for JP2003330781; published on Nov. 21, 2003 and retrieved on Oct. 13, 2014.
Office Action mailed Oct. 21, 2013; in corresponding Chinese patent application No. 201080015811.9.
Office Action mailed Oct. 3, 2013; in corresponding Canadian patent application No. 2,755,913.
Patent Abstract for JP2000172721; published on Jun. 23, 2000.
Patent Abstract for JP2008141339; published Jun. 19, 2008.
Patent Abstract for JP2004206694; published on Jul. 22, 2004.
Patent Abstract for JP2004362596; published Dec. 24, 2004.
English language Office Action mailed Dec. 3, 2013; in corresponding Japanese patent application No. 2012503674.
Office Action mailed Sep. 16, 2014; in corresponding Japanese patent application No. 2013262835.
English translation of the Office Action mailed Sep. 16, 2014; in corresponding Japanese patent application No. 2013262835.
English translation of the Notice of the First Office Action mailed Apr. 21, 2014; in corresponding Chinese patent application No. 201080056327.0.
English translation of the First Office Action mailed Oct. 21, 2013; in corresponding Chinese patent application No. 201080015811.9.
Suzuki, Yasuhiro et al.; " Cloud Computing, Provision", No. 58. Jul. 31, 2008, pp. 35-41.
Amazon HQ Wki, "RDSMySQLConfigManagement/ConfigWorkflowDesign", RDS/EDS/DesignDocs/RDSMySQLConfigManagement/ConfigWorkflowDesign from https://w.amazon.com/index.php/RDS/EDS/DesignDocs/RDSMySQLConfigManagement/ConfigWorkflowDesign; downloaded Aug. 11, 2009; 2009.
English translation of the First Office Action mailed Jun. 26, 2014; in corresponding Chinese patent application No. 201080056327.0.
The First Office Action mailed Jun. 26, 2014; in corresponding Chinese patent application No. 201080056327.0.
English abstract for JP2009522659; published on Jun. 11, 2009 and retrieved on Oct. 13, 2014.
NPL__51__English abstract for JP2009522660; published on Jun. 11, 2009 and retrieved on Oct. 14, 2014.
NPL__52__Final Office Action mailed Nov. 6, 2014; in corresponding U.S. Appl. No. 12/416,017.
NPL__53__Notice of Second Office Action mailed Oct. 29, 2014; in corresponding Chinese patent application No. 201080053676.7.

(56) References Cited

OTHER PUBLICATIONS

NPL__54__English translation of the Notice of Second Office Action mailed Oct. 29, 2014; in corresponding Chinese patent application No. 201080053676.7.

NPL__55__Final Office Action Mailed Nov. 6, 2014: in U.S. Appl. No. 12/416,017.

NPL__56__Office Action dated Oct. 29, 2014; in Chinese Patent Application 201080053676.7.

* cited by examiner

MONITORING AND AUTOMATIC SCALING OF DATA VOLUMES

CROSS-REFERENCE TO RELATED APPLICATIONS

This application is related to co-pending U.S. patent application Ser. No. 12/415,958, entitled "Control Service and Relational Data Management," filed concurrently herewith, which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

The amount of resources needed by a customer can change over time. For example, the customer might require additional processing capacity for various applications, or might require additional storage capacity for customer data. Currently, the management of such resources is a manual procedure, which requires a database administrator (DBA) or other such operator to view statistics and usage data by customer, and determine when to request that the customer authorize an increase or decrease in allocated capacity. When receiving a request from a customer to adjust a capacity, the DBA must determine the appropriate type of adjustment and perform the adjustment. Often, this requires taking down a data store for the customer for a period of time necessary to make the adjustment. Further, such an approach can be reactive, in that a customer will not know that an increase is needed until the capacity for the customer is full or exceeded.

BRIEF DESCRIPTION OF THE DRAWINGS

Various embodiments in accordance with the present disclosure will be described with reference to the drawings, in which.

DETAILED DESCRIPTION

Figure 1:
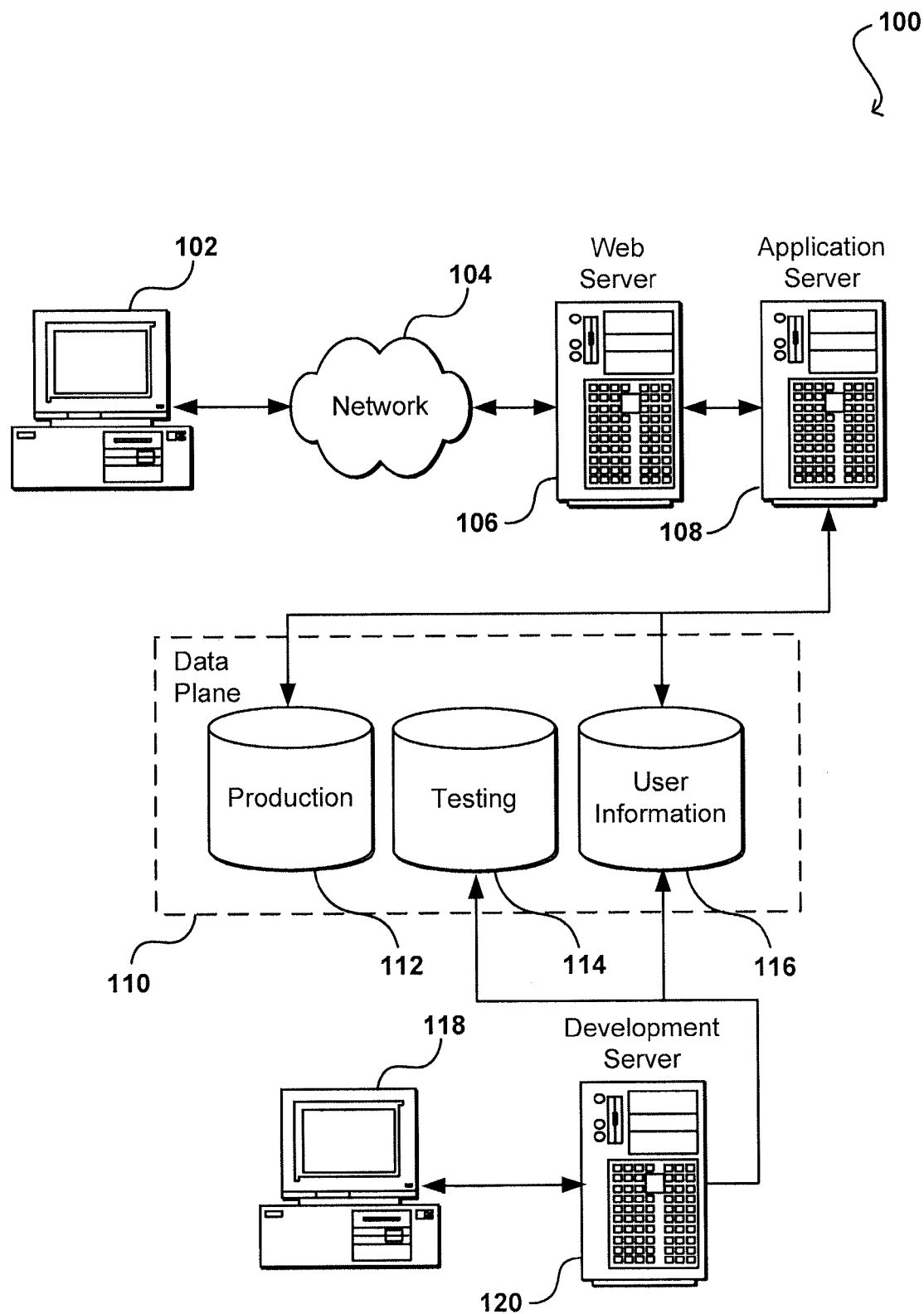
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of data storage in an electronic environment. In particular, various embodiments provide a separate control environment, or control plane, that can be used to monitor and/or control aspects of a data environment, or data plane. The functionality of a control plane can be provided as a set of Web services, for example, enabling the control plane to act as a virtual database administrator (DBA). A user or customer can submit a request to the control plane through an externally-visible application programming interface (API), for example, which can be analyzed to determine actions to be performed in the data plane, such as actions that create, delete, modify, expand, or otherwise modify a data store or data storage instance. State information can be passed to a component of the data plane for each task necessary to perform the action, such that the control plane can manage the performance of the tasks without having direct access into the data stores or other such components of the data plane. Once provisioned, a user can native access to the data instance(s) in the data plane, and can simply point existing applications (such as MySQL applications) to the domain name system (DNS) name or other location information for the particular data instance. There is no restriction or modification of query models or other such functionality, as a user can continue to use applications built on MySQL, Oracle, or other such database technology.

Systems and methods in accordance with various embodiments take advantage of a monitoring component in the control plane to continually monitor performance aspects of the data environment, such as by monitoring host machines or data instances for a relational database or other such data storage system. The monitoring component can contact host managers, or other such components in the data plane, to obtain performance information such as the capacity and usage of processing, memory, storage, I/O, and other such resources. The monitoring component can store and/or receive historical information for the data plane, such that the monitoring component can do trending and/or historical analysis of the performance data. Using such an approach, the monitoring component can predict future capacity and/or resource needs for a customer, and can recommend appropriate scaling or other such adjustments in capacity or other such aspects. In some embodiments, components of the control plane can be authorized to act on behalf of the customer, in order to automatically scale or allocate capacity as needed (or predicted).

Use of such a control plane can enable a customer or DBA to better understand the scalability bottlenecks of the data environment by automatically collecting and analyzing data from the data environment, without being intrusive to the customer or other users of the data environment. The control plane components also can determine an appropriate action to take, and can either recommend the action to the customer or perform the action on behalf of the customer.

In some embodiments, an operator or data service provider can send the appropriate metrics or other such information to a control service. The service can analyze the data, such as by performing a trending analysis, and determine appropriate actions to be taken. The control service then can send a recommendation to the requesting operator, or can automatically work with the data environment to perform any necessary scaling or other such operations.

In some embodiments, a customer can be provided with the ability to specify certain actions to be taken in certain circumstances. For example, a customer can be provided with an interface into the control plane that allows the customer to authorize specific actions in response to determinations or recommendations from the monitoring component (or another such component of the control plane). For example, a customer might authorize an increase in processing capacity when the processing capacity reaches a certain level, or is projected to reach a certain level within a certain time. A customer also might authorize an increase in storage capacity as needed, so as to not risk losing data. A customer might also specify to not exceed a certain price point, such that the monitoring component can work with an accounting or other such system to ensure that resources are not allocated beyond a certain price limit. There can be other factors, such as maximum latency, minimum requirements, etc., that can be considered as well, as discussed elsewhere herein.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide a relational database service ("RDS") that enables developers, customers, or other authorized users to easily and cost-effectively obtain and configure relational databases so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
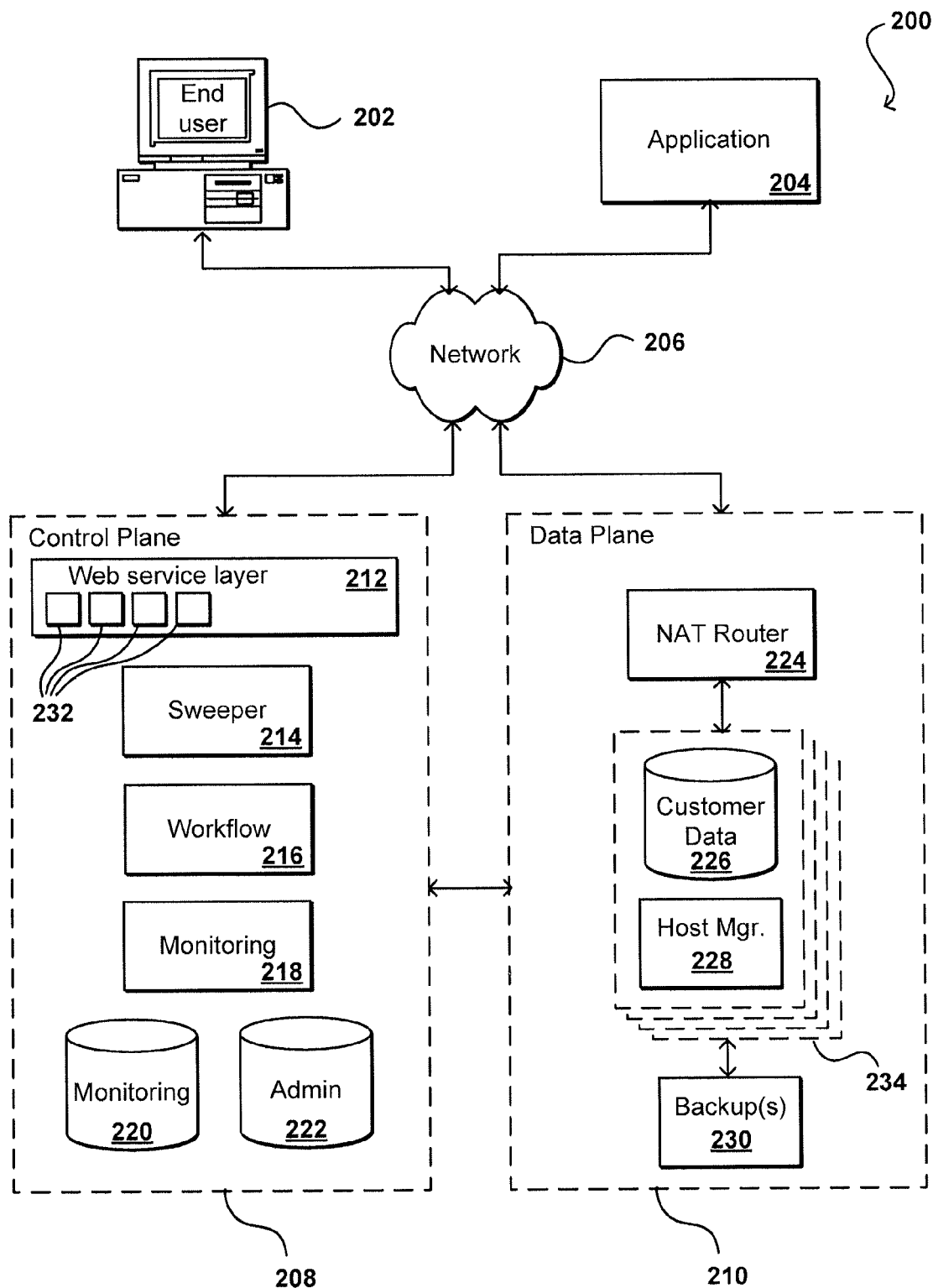
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206, which the Web services layer can parse or otherwise analyze to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might includes tasks such as provisioning a data store instance, allocating a volume of off-instance persistent storage, attaching the persistent storage volume to the data store instance, then allocating and attaching a DNS (domain name system) address or other address, port, interface, or identifier which the customer can use to access or otherwise connect to the data instance. In this example, a user is provided with the DNS address and port to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

As discussed, one advantage to use of a control plane is that the control plane can function as a virtual database administrator (DBA) and avoid the need for a human DBA to perform tasks such as monitoring performance data and performing trending or other such analysis. A control plane can also perform functions such as automatically performing scaling or other such actions in the event of an actual or predicted need for adjustment in capacity. In conventional systems, metrics or other such information are collected and a DBA is tasked with analyzing the information. Exceeding an allocated processing, memory, or storage capacity in the cloud, for example, can result in a loss of data, resource availability, or other such failure. Conventional approaches relying on a DBA to perform actions such as monitoring, analysis, and adjustment are expensive and time-consuming, and can result in significant unavailability of customer data during the adjustment process.

Figure 3:
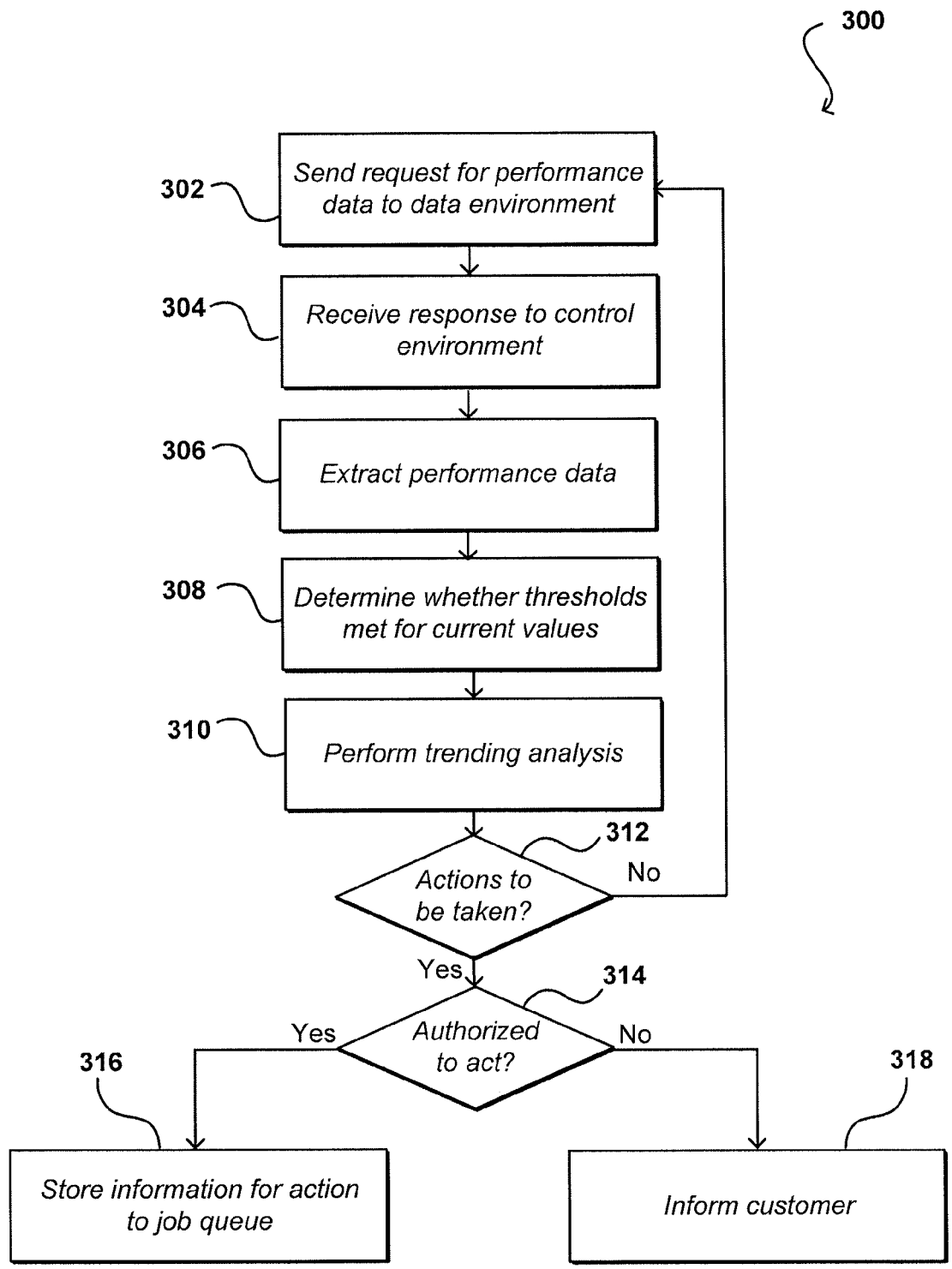
FIG. 3 illustrates an example process for analyzing performance information that can be used in accordance with one embodiment.

As discussed above, a control plane can be used to perform tasks such as collecting data, analyzing the data, and determining appropriate actions to be taken. FIG. 3 illustrates an example process 300 that can be used by components of a control plane to monitor resource usage and determine when adjustments should be made in accordance with one embodiment. In this example, a monitoring component of the control plane is able to periodically send requests for performance data into the data plane 302. As discussed above, these requests can be sent to host managers, which are able to collect performance information from the host devices, data instances, and other components of the data environment monitored by each host manager. In response to a request, each corresponding host manager can collect the information needed to respond to the request, such as allocation, capacity, and/or usage information for components such as processors (e.g., CPUs), memory (e.g., RAM), or storage (e.g., data volume). The information can include current information and/or recent information since the last request. Once each host manager has collected the appropriate information, the information can be sent as a response that is received to the monitoring component of the control plane 304. Upon receiving the information, the monitoring component can parse or otherwise extract the appropriate information, and analyze the extracted performance information 306. In some cases, the monitoring component can determine current capacity values and compare those capacity values to thresholds specified by a customer or operator 308. While the term "customer" is used herein to refer to the "owner" of data, or a data store or instance hosted by the RDS system, it should be understood that the term customer is merely an example, and that any appropriate user or developer can be allowed to access the control plane and/or data plane in the various embodiments. In some cases, the monitoring component might also (or alternatively) pull historical data from a monitoring data store (or other such location of the control plane) and perform trending analysis on the data 310. For example, the capacity values might not currently exceed a threshold, but based upon a rate of increase or other such information, it can be predicted that the capacity value will meet or exceed such a threshold at a determined time. Based on the analysis, the monitoring component can determine whether any actions should be taken 312, such as a scaling of capacity for a given customer. If no action is to be taken, the monitoring process can simply continue. If an action is to be taken, a determination can be made, depending upon the embodiment, as to whether the control plane is authorized to perform the action 314. If the control plane is authorized to act, the monitoring component can cause information for the determined action to be stored to a job queue 316. If the control plane is not authorized to act automatically, the monitoring component can inform the customer of the situation 318 such that the customer can decide to scale or perform another such action.

In some embodiments, a customer can be provided with the option of determining which (if any) actions should be taken automatically, as well as the criteria for which any of those actions should be taken. The criteria also can be set by a DBA, database service provider, or other appropriate entity. Further, although a monitoring component is described in this example, it should be understood that various functionality can be allocated to additional and/or alternative components of the control plane within the scope of the various embodiments.

Figure 4:
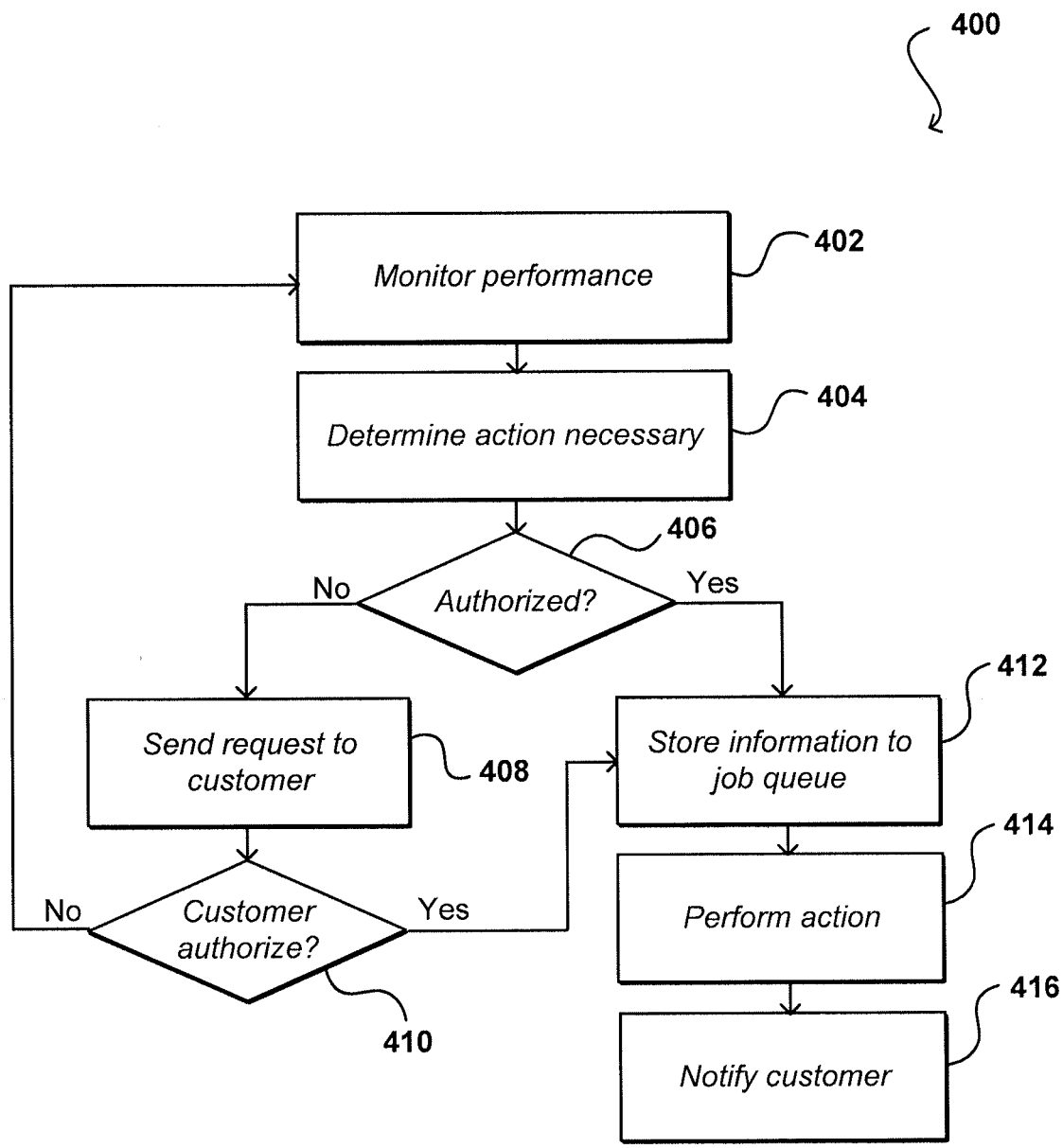
FIG. 4 illustrates an example process for causing an action to be performed in accordance with one embodiment.

FIG. 4 illustrates in more detail an example process 400 by an action can be scheduled to be performed in accordance with one embodiment. In this example, performance information is monitored for aspect of the data environment 402 and a determination is made that an action is (or is likely to be) needed 404, using an approach such as that described with respect to FIG. 3. If an action is recommended to be performed based upon such an analysis, the monitoring component can check information stored to a monitoring data store or other such location that stores authorization information. In some embodiments, this can include customer preference information, wherein a customer can select and/or modify how different actions are authorized as discussed elsewhere herein. A determination is made as to whether the control plane is authorized to perform and/or schedule the recommended action 406. If the control plane is not authorized to automatically schedule the action, a request or other such notification can be sent or provided to the customer, or other authorized user, requesting authorization to perform the action 408. This request can include any appropriate information, such as the current capacity, any predicted capacity, threshold information, and recommended action information. A determination is made as to whether a response is received from the customer within a predetermined amount of time 410, which can vary for different actions, customers, embodiments, etc. If no authorization is granted, such as may be due to no response being received or due to an explicit instruction from the customer, then the system can simply continue the monitoring process without making a modification. In some cases, the system might wait a specified amount of time to determine if an action should still be taken, and can follow up after a specified amount of time. In other embodiments, a secondary threshold can be specified wherein the system will not contact the customer again unless another threshold is met or exceeded, such as where a resource is actually at capacity instead of simply being predicted to be at capacity at some point in the future. If the authorization is received from the customer, or if the control plane was authorized to perform or schedule an action, then information for the action can be stored to a job queue 412 or other such location. Once information is stored to the job queue, the action can be performed 414 and the customer notified 416.

Figure 5:
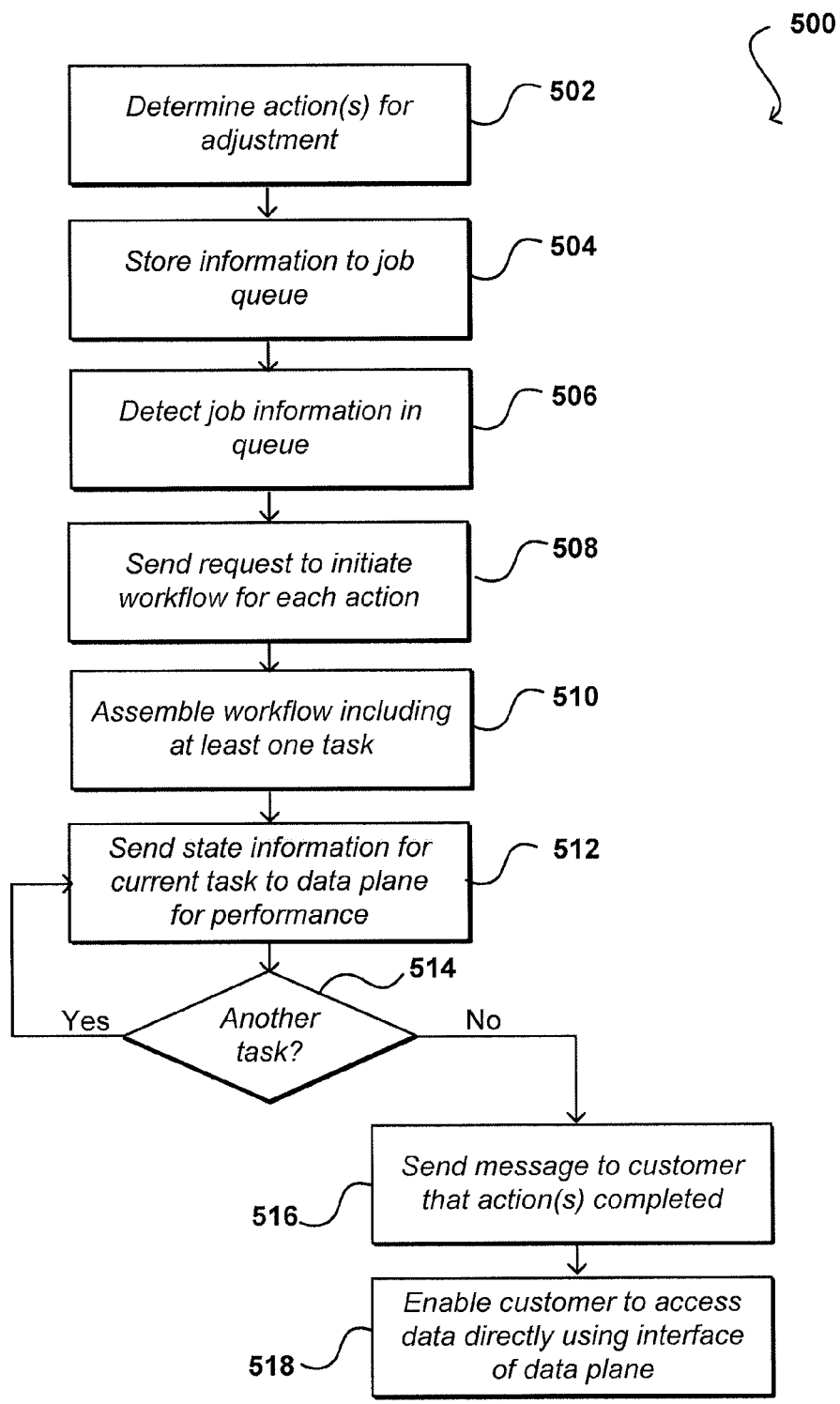
FIG. 5 illustrates an example process for performing an action in accordance with one embodiment.

FIG. 5 illustrates an example process 500 for performing the action and notifying the customer, in accordance with one embodiment. Using components and/or processes such as those discussed above, a determined action with respect to the data environment is authorized to be performed 502. As discussed, this can take the form of the monitoring component automatically requesting an action to be performed or a customer authorizing the performance of an action, while in other embodiments a customer could instead submit a request via an externally-facing API of the Web services layer, which can parse the request to determine the action(s) being requested. In this embodiment, information for the action, such as the type of action and parameters to be used to perform the action, is written to a job queue 504, such as may be located in an Admin data store or other such storage location. The job queue can be monitored, such as by a sweeper component, to determine the presence of job information 506 and, when job information is detected, a request can be sent to initiate a workflow for the requested action 508. This can include a request sent by the sweeper component to a workflow component and/or service to instantiate a workflow. In other embodiments, a workflow component might monitor the job queue for jobs, or a component of the Web services layer may send the job information directly to a workflow component.

Upon receiving the job information, the information is analyzed to determine and/or assemble an appropriate workflow for the requested action 510. As discussed, different tasks can be selected for the workflow based upon factors such as the type of action requested and the type of database engine being used. Beginning with the first task of the workflow, state information is sent to a host manager in the data environment operable to use the state information to determine a task to be performed, perform the task with respect to a data repository and/or data instance, and return a response upon completion of the task 512. Upon receiving the response, the workflow component determines whether there is another task to be performed 514. If so, state information for the next task is sent to the host manager, and upon completion of that task the host manager sends a response to the workflow component. After the final task has been completed, a message is sent to the requesting customer (or another appropriate user, application, or location) that the requested action has been completed 516. After the action has been performed, the customer is able to directly access the data instance upon which the action was performed using a data interface of the data environment, without accessing or passing through the control plane 518. As mentioned, the user can provided with a DNS name and port number, for example, such that if the action resulted in movement of data or another similar action, the customer or an application can continue to use the same DNS name, which will be directed to the appropriate location in the data plane.

There can be various aspects of the data plane that can be monitored, and different policies that can be applied to each. For example, the rates at which data and CPU usage change can vary significantly from the rates at which data storage vary. There also can be other aspects, such as data input and output (I/O), that change at different rates as well. Each of these aspects can require different metrics to be captured (e.g., available bandwidth vs. storage capacity), and can require different algorithms to analyze those metrics. There also can be different historical information captured and information logged, which can be used to determine when to scale or perform another such action. Some embodiments also require separate interfaces for each of these actions. Such factors can make it very difficult to manage manually, and can be advantageously provided by the control plane.

For example, a monitoring component can determine that a data store for a customer is mostly memory bound because the customer is read intensive and thus the data environment is allocating significant effort on the buffer cache. In such an example, the processing capacity and memory can be the bottleneck to be addressed. If the customer is write intensive, on the other hand, then the customer can mostly be writing to disk and the I/O might be the bottleneck. If the customer is storage bound, where the amount of data is increasing continually, the monitoring component can anticipate future need and can recommend adjustments to the customer such as adding 20 GB (as an example) of storage capacity per month.

As discussed, the monitoring component can call into one or more host managers to obtain information such as CPU and memory utilization, I/O metrics, and storage space usage. The information to be obtained can include not only the current data, but also log information. The monitoring component can analyze historical data for a period such as the past two weeks, for example, and can run trending analysis or other types of data analysis. The trending analysis can be anything from a linear fit to a complex prediction algorithm as known in the art for trending, prediction, or other such purposes. In other embodiments, the historical data can be exposed to the customer (or another appropriate entity) for analysis.

When information analyzed by the monitoring component is determined to require an action, such as through an automatic authorization or customer authorization, information for the action in one embodiment is fed into at least one trigger mechanism. The trigger mechanism can be any appropriate component of the control plane (or external to the control and data planes in some embodiments), wherein analysis of at least one metric meeting or exceeding a threshold can result in a trigger mechanism being activated. Instead of, or in addition to, writing information to a job queue as discussed above, the trigger mechanism receiving the action information can cause a workflow to be kicked off for a particular action. For example, a customer or operator can set up a trigger to kick off a workflow to increase processing capacity if the processing capacity over a two week period is consistently over 70%. Thus, when the monitoring component analyzes historical data for that customer, a determination that the capacity was over 70% for at least the threshold period can cause information for the determination to be fed to at least one trigger mechanism, in order to kick off the appropriate workflow or otherwise cause the scaling action to be performed as discussed or suggested herein.

Figure 6:
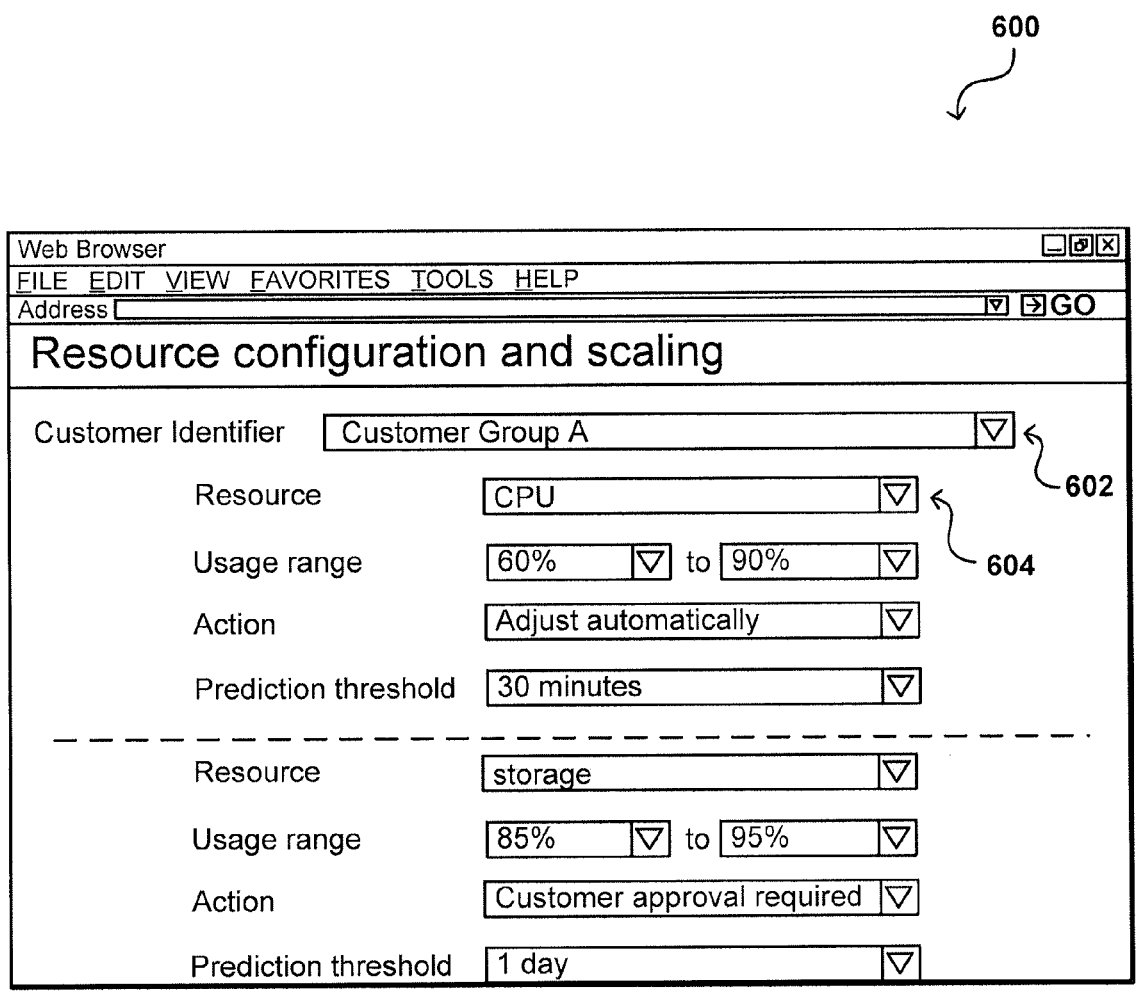
FIG. 6 illustrates an interface enabling a customer to set scaling parameters that can be used in accordance with one embodiment.

A user can set several such thresholds, which can be used by the monitoring system to determine whether an action should be taken or at least recommended. FIG. 6 illustrates an example 600 of a resource configuration page that can be used to provide thresholds, authorizations, and other such information in accordance with one embodiment. In this example, a customer is able to access a page through a browser or other user interface application to view and/or modify authorization settings. Although not shown, it should be understood that the customer can be required to go through an authentication or verification process as known in the art. In some embodiments, the user accesses the resource configuration page through the Web services layer of the control plane, and is authorized or verified using the mechanisms provided therein. The user can specify a group, account, or other such identifying information 602, as a customer can have multiple accounts for different applications, data sources, etc. For each account, the customer can be presented with user-modifiable options 604 to specify various resources in the data plane and criteria for modifying those resources. In this example, the customer has selected a processing resource, and specified that the processing allocation for this user account should be between 60% and 90%. A user might specify a top end of 90% because, for example, the customer wants to avoid being at, or exceeding, capacity faster than an adjustment can be made. A customer also might specify a minimum usage allocation, as the customer may not want to pay for excessive processing capability that is not being used. The customer in this example also specified that the control plane is able to make this adjustment automatically once it is determined that an action should be taken for the processing resource. The customer also has specified a threshold that the action should be taken when it is predicted that the capacity will fall outside the specified range within 30 minutes, as determined by trending or other such analysis.

In this example, the customer also has specified criteria for scaling the storage for this account. As shown, the customer has specified that the storage should be at 85%-95% of capacity. The customer can use a tighter range for the storage, as storage capacity will likely vary more slowly than the processing capacity. The customer has also specified that customer approval is required before scaling the storage. In this case, the customer has specified that the customer should be notified one day in advance of when the storage capacity is predicted to be outside the specified range. The customer then can decide whether or not to adjust the storage, as well as to decide the amount of storage to re-allocate.

One advantage to providing a user with the ability to authorize automatic adjustments is that components of the control environment can automatically scale various components or resources in the data plane in order to ensure that the customer always has sufficient capacity, and can reduce the allocated capacity when not required, in order to reduce the overall cost to the customer. Such an approach can be beneficial in cloud computing environments, for example, where a customer may be purchasing processing, memory, data, and other such capacity, but does not care about aspects such as the location, type, number, or other aspects of the resources, caring instead about factors such as availability, cost, and reliability. By enabling the system to automatically scale the resources without affecting the availability of the resources, a customer can be sure to almost always have sufficient resources allocated without having to purchase an excessive amount of resources in order to handle periods of peak capacity.

In one embodiment, metrics are automatically collected for parameters such as processing capacity, storage capacity, etc., as discussed above. The information can be stored to a monitoring data store or other such location for analysis by the components of the control plane (or for exposure to a customer in some cases). The monitoring component (or other such component) can run trending analysis on this information over a specified period of time, and can further extrapolate the information to predict future needs, bottlenecks, or other such circumstances. In one embodiment standard prediction and extrapolation algorithms can be used, such as linear or non-linear algorithms known or conventionally used for prediction and extrapolation of data. When authorized by the customer (either through customer settings or as part of the customer subscribing to a control service, for example), the monitoring component can automatically cause an action to be performed each time a bottleneck is predicted within a certain amount of time, a resource is above or below a threshold range for a period of time, or for any other appropriate criteria. As part of the workflow generated for the action, a task can invoke the appropriate API to perform the desired scaling. For example, a "modifyDatabase" or similar API can be called to increase or decrease the storage capacity for a customer.

An advantage to such an approach is that the scaling of storage can involve adding a data instance and rebalancing the storage, which can be performed without taking down, or otherwise affecting the availability of, the customer data store. In many cases, a user will not notice a change occur. In conventional systems, a DBA would need to obtain the additional storage and add the storage to the RAID (Redundant Array of Inexpensive Disks) controller, repurpose at least one machine, reboot the operating system, and/or perform other such tasks which can make the data store unavailable for a period of time. In a system in accordance with various embodiments, however, an extra data volume can be provisioned and attached to the data instance to increase storage capacity. For example, if storage capacity for a customer is to be increased by 200 GB, the service can provision four or five volumes of 40 GB or 50 GB each, and attach those volumes to the instance. The attached volumes can be added to a single logical volume, which can emulate the behavior of one single volume, disk, or other such abstraction. Each physical volume is added to, or removed from, the logical volume group in order to increase or decrease capacity. Once the capacity is changed, re-balancing across the new set of volumes can be performed automatically, with new writes or other actions automatically percolating to the appropriate volumes. Since a logical volume manager approach is being used over the data instances, the data store does not need to be taken down for any reason. Similarly, requests to a relational database instance will not fail as a result of the scaling action.

Scaling of other resources can be performed in a similar fashion. For example, processor or CPU scaling can be performed automatically as needed. In some cases, it may be necessary to make the data store temporarily unavailable in order to adjust or scale resources such as the processing, memory, or I/O resources. Each customer or operator can specify a maintenance window, such as a time period of traditionally low levels of activity, in which such actions are to occur. Information and various metrics can be obtained for a resource, and when any action is determined to be necessary, information for the action can be written to a job queue. For actions such as the scaling of processing capacity, where it can be necessary to take down the data store for a small period of time, the information written to the job queue can include a flag or other parameter value indicating that the action is only to be performed during the next (or a subsequent) maintenance window. A sweeper or other such component checking the job queue can examine the parameter value, and only extract the job during a maintenance window. In other embodiments, the information written to the job queue can include a time range or other appropriate information indicating to a sweeper component when to extract the information and perform the action. In still other embodiments, a sweeper might extract the job information at any time, and as part of the task information for a workflow a time window can be included wherein a component of the data plane is to perform the task. Several other such approaches can be used within the scope of the various embodiments.

Auto-Scaling Example

In this example, a monitoring component performs trending and extrapolation of customer information from the data plane and determines that an increase in capacity is recommended. In this example, the customer has an existing volume group with one physical volume of 40 GB, and the recommended action is to add another 30 GB of storage capacity. The monitoring component can cause a workflow to be executed as discussed elsewhere herein. As part of the workflow, a task can cause a host manager to initiate at least one new volume using a "/pvcreate <device_name>" or similar command or API. Here, a single volume of 30 GB is being added. Another task can instruct a host manager to extend the existing volume group by adding the new physical volume, such as by calling a "vgextend <VolumeGroup><device_name>" or similar command or API. Another task can rebalance the volume group by analyzing the allocation map for each physical volume for the particular volume group to determine the physical extents (PEs) for each volume. Each physical volume is divided into chunks of data, known as physical extents, which generally have the same size as the logical extents for the volume group. By analyzing the allocation maps for each volume, a determination can be made that, for this example, the first (40 GB) physical volume has a total physical extent (PE) count of 10239, an allocated PE count of 10239, and a free PE count of 0. For the second (30 GB) physical volume, there is a total PE count of 7500, with an allocated PE count of 0, and a free PE count of 7500. Thus, there are 17739 physical extents across the first and second devices, which can be distributed once the new volume is added. The total available extents and total used extents are determined by adding the extents for each volume in the volume group. In this example:

$$\text{Total Extents} = 10239 + 7500 = 17739$$

$$\text{Total Used Extents} = 10239 + 0 = 10239$$

The percentage of usage of each volume can be calculated by dividing the total PEs for a volume by the total number of extents, and then multiplying this value by the total number of used extents. In this example:

$$\text{First device utilization} = 10239/17739 * 10239 = 5910$$

$$\text{Second device utilization} = 7500/17739 * 10239 = 4329$$

The allocated space can be rebalanced to maximize the IOPS (input/output operations per second) performance for the volume group. In this example, the rebalancing can be performed by reallocating and moving PEs to the second device, such as by calling a "/pvmove/dev/second_device:5910-10239" command, which reallocates 4329 PEs to the second physical volume per the calculation above. After the rebalancing is completed, the logical volume and/or file system can be extended for the new capacity.

A similar process can be performed when reducing storage capacity. At least one volume can be removed from the volume group in order to reduce the volume group storage to the desired capacity. The total extents then can be compared with the usage of each remaining volume to rebalance and/or reallocate across the adjusted volume group.

For each of the tasks in such a workflow, at least one test for success or failure can be executed. For example, it can be desirable to ensure that a volume was successfully created before adding the volume to the volume group and attempting to reallocate PEs to that volume. If a test is run for a task, and it is determined that the task was not successful, the task can be retried at least one time (possibly up to a determined or selected number of times) before generating an error message or other such notification. The testing and retry can be performed automatically via the data environment, or as managed by the control environment. If a task fails a specified number of times, the entire process should be failed in order to avoid errors, data loss, or other such issues. Further, the control plane can manage the reversal of previous tasks, such as removing a volume from a volume group if the PEs cannot be reallocated to that volume. Various other approaches can be used as well within the scope of the various embodiments.

Another service that can be provided to a potential customer is to perform and/or recommend scaling based at least in part upon factors such as cost and latency. For example, a customer might wish to scale as necessary to provide optimal performance, but might not wish to scale beyond a certain cost point. A customer also might be willing to allow latency to reach a certain level before scaling unless a certain cost benefit is determined to be gained from the scaling. In other embodiments, a customer might request the lowest cost configuration for a given situation. For example, a situation can arise that might be addressed by scaling memory for purposes of caching, scaling the number of concurrent connections, and/or by increasing the processing speed or capacity. At least one algorithm can be used by the control plane to analyze the cost/benefit of each such adjustment, and the permutations of each possible adjustment, to determine a lowest cost solution to the customer. This could include any appropriate combination, such as scaling a portion of the recommended processing capacity in conjunction with scaling a portion of the recommended memory capacity, etc. Any appropriate algorithm for analyzing metrics and cost factors to determine an optimal solution can be used as should be apparent to one of ordinary skill in the art in light of the teachings and suggestions contained herein.

As discussed previously, the use of a control plane or service in accordance with various embodiments does not restrict the type of SQL queries that a customer can run, and does not impose any restrictions relating to construction of a schema, such as to be partition ready and not allow queries spanning partitions. Instead, a repository such as a relational database can be provisioned in a computing "cloud" without restricting the users' schema or queries. As commonly known, even though there is a theoretical SQL standard, the SQL quirks, syntaxes and their behaviors (e.g., NULL handling) vary across different relational database engines (e.g., MySQL, Oracle, or Postgres). For at least these reasons, users may wish to choose a relational database engine that is familiar for purposes of programming and operations. Such an approach allows customers to use the same set of database tools that the customers have used previously for tasks such as data modeling, development, and debugging, even when the customers migrate their data stores to the cloud (or elsewhere) via the control plane. Using such an approach, customers are not required to rewrite their application or any operational tools, which lowers the barrier of entry significantly for customers to move data to the cloud.

A customer's data repositories can be moved to the cloud in one embodiment by running the repositories on compute nodes of a cloud computing environment. Block level storage volumes, such as off-instance storage volumes that persist independently from the life of an instance, can be used with these instances for storing the repository binary, logs and volumes, for example. Such an approach can be advantageous, as the virtualization provides flexibility to quickly and easily scale a compute and storage resources for a repository. Further, such an approach can provide for persistent storage in the cloud.

As known in the art, relational databases can be run in different modes, such as may include: stand-alone (non-replicated), replicated, or replicated and partitioned. A customer typically makes the choice of which mode to run for a repository based on the availability and scalability needs of the repository and the incurred total cost of ownership (TCO). Some applications and services to not require a repository to be highly available and durable, and may instead utilize a stand-alone repository that is able to tolerate outages on the order of minutes. Other applications and servers can require a repository to be always available, and require the repository to never lose data even in the event of a failure. In this case, the applications and services typically require a replicated database offering. Some users, applications, or services require a massively scalable repository that can partition data across multiple repositories, such that scaling can occur beyond the compute and storage capacity of a single database. To address these different use cases, an approach in accordance with one embodiment offers at least two modes, such as stand-alone and high availability, for each database engine. Some embodiments also allow customers build their own partitioning layer on top of either stand-alone or high availability repositories.

As mentioned, the control plane layer can take advantage, or "sit on top," of various basic software frameworks for performing tasks such as: implementing workflows, establishing secure communication channels between the host managers of the data plane and the components of the control plane, installing software on the instances of the data plane, and performing various database backup and recovery procedures.

For example, a control plane layer can take advantage of a workflow service to manage workflows. As commonly known, a key characteristic of any workflow engine is that the engine enables asynchronous and resumable processing. As discussed above, a workflow can be thought of as a state machine that starts with an initial state and goes through a series of intermediate state transitions by executing different steps of the workflow before reaching the end goal. This end goal can be thought of as the terminal state of a state machine. A workflow service offers the ability to create workflows, and provides hooks to determine the current state of a given workflow and the step(s) to next be executed. The service can store the current state of the state machine, keeping track of the steps which executed successfully and the steps that must be executed to keep the workflow moving. The service does not, in general, actually execute the state transitions for us. The precise tasks of executing the tasks for a workflow will in many embodiments be performed by the "client" components of the workflow.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of scaling storage capacity in a data environment using a separate control environment, comprising:
under control of one or more computer systems configured with executable instructions,
obtaining performance information for a logical data volume in the data environment, the performance information including at least one of storage usage information or storage capacity information for the logical data volume, the logical data volume corresponding to data stored among one or more physical volumes;
extracting historical information for the logical data volume, the historical information representing values of at least some of the performance information over a period of time;
analyzing the performance information and the historical information using at least one prediction algorithm to predict that an anticipated usage value will fall outside of at least one specified range within at least one specified time period;
selecting a scaling action for adjusting a storage capacity of the logical data volume for the anticipated usage value to fall inside the at least one specified range within the at least one specified time period based at least in part upon determining that a cost of implementing the scaling action is a lowest cost among a plurality of scaling options;

determining whether authorization is granted for implementing the scaling option based at least in part upon the cost of implementing the scaling option not exceeding a specified cost threshold; and executing a workflow in the separate control environment for adjusting the storage capacity of the logical data volume in the data environment based at least in part upon the scaling option in response to determining that the authorization is granted, the storage capacity being adjusted in the data environment by: (a) changing a number of the one or more physical volumes that collectively provide the storage capacity for the logical data volume without reducing availability of the logical data volume and (b) balancing input output performance among the one or more physical volumes.

2. The computer-implemented method of claim 1, wherein changing the number of the one or more physical volumes comprises:

initiating at least one new physical volume; and extending the logical data volume by attaching the at least one new physical volume.

3. The computer-implemented method of claim 1, wherein balancing the input output performance among the one or more physical volumes is based at least in part on a number of available physical extents for the one or more physical volumes.

4. A computer-implemented method of scaling aspects of a data environment using a separate control environment, comprising:

under control of one or more computer systems configured with executable instructions, obtaining performance information for at least one resource of a database in the data environment, the performance information including at least one of usage information or capacity information for the at least one resource, the at least one resource associated with a logical device corresponding to one or more physical devices;

extracting historical information for the at least one resource, the historical information representing values of at least some of the performance information over a period of time;

analyzing the performance information and the historical information using at least one prediction algorithm to predict that an anticipated usage value for the at least one resource will fall outside of at least one specified range within at least one specified time period;

selecting a scaling action, from among a plurality of scaling options, for adjusting a capacity of the at least one resource, the capacity of the at least one resource being adjusted based at least in part upon the anticipated usage value, the scaling action being selected based at least in part upon a respective cost corresponding to each of the plurality of scaling actions;

determining whether authorization is granted for the scaling option based at least in part upon the cost corresponding to the scaling option; and executing a workflow in the separate control environment for adjusting the capacity of the at least one resource in the data environment based at least in part upon the scaling option in response to determining that the authorization is granted, the capacity being adjusted in the data environment by: (a) changing a number of the one or more physical devices that collectively provide the capacity for the logical device and (b) balancing input output performance among the one or more physical devices.

5. The computer-implemented method of claim 4, wherein the at least one resource includes at least one of a processing component, a data storage component, a memory component, a communications component, a network I/O (input/output) component, or a data I/O component.

6. The computer-implemented method of claim 4, wherein executing the workflow comprises:

generating a series of tasks for adjusting the capacity; and for each of the series of tasks, passing state information from a monitoring component in the control environment to a host manager in the data environment, wherein the host manager is operable to execute the task and return a response to the monitoring component.

7. The computer-implemented method of claim 6, further comprising:

determining a success or failure of each of the series of tasks before performing any subsequent task.

8. The computer-implemented method of claim 6, further comprising:

when a task is determined to have failed, retrying the task at least once and determining success or failure of each retry; and when the task and the retry are determined to have failed, failing the workflow.

9. The computer-implemented method of claim 8, wherein:

failing the workflow includes rolling back each previously-executed task of the workflow.

10. The computer-implemented method of claim 4 further comprising:

when adjusting the capacity of the at least one resource is determined not to be authorized, contacting a user for the authorization before executing the workflow.

11. The computer-implemented method of claim 4 further comprising:

enabling a user to provide different levels of authorization for the at least one resource.

12. The computer-implemented method of claim 4, further comprising, after predicting the anticipated usage value for the at least one resource:

sending information including the anticipated usage value to an authorized user of the at least one resource; and enabling the authorized user to call into the control environment to request the adjusting of the capacity of the at least one resource.

13. The computer-implemented method of claim 4, wherein the scaling action corresponds to a lowest cost among the plurality of scaling actions.

14. A system for scaling aspects of a data environment using a separate control environment, comprising:

at least one hardware processor; and hardware memory including instructions that, when executed by the at least one processor, cause the system to:

obtain performance information for at least one resource of a database in the data environment, the performance information including at least one of usage information or capacity information for the at least one resource, the at least one resource including a logical device volume corresponding to one or more physical devices;

extract historical information for the at least one resource, the historical information representing values of at least some of the performance information over a period of time;

analyze the performance information and the historical information using at least one prediction algorithm to predict that an anticipated usage value for the at least one resource will fall outside of at least one specified range within at least one specified time period;

select a scaling action, from among a plurality of scaling options, for adjustment of a capacity of the at least one resource, the adjustment being based at least in part upon the anticipated usage value, selection of the scaling action being based at least in part upon a respective cost corresponding to each of the plurality of scaling actions;

determine whether authorization is granted for the scaling option based at least in part upon the cost corresponding to the scaling option; and execute a workflow in the separate control environment for the adjustment of the capacity of the at least one resource in the data environment based at least in part upon the scaling option in response to a determination that the authorization is granted, the adjustment including (a) a changing of a number of the one or more physical devices that collectively provide the capacity for the logical device and (b) a balancing of input output performance among the one or more physical devices.

15. The system of claim 14, wherein:
the at least one resource includes at least one of a processing component, a data storage component, a memory component, a communications component, a network I/O component, or a data I/O component.

16. The system of claim 14, wherein the memory further includes instructions that, when executed by the processor, cause the system to:
when the determination is that the authorization is not granted, contact a user for the authorization before executing the workflow.

17. The system of claim 14, wherein the memory further includes instructions that, when executed by the processor, cause the system to:
enable a user to provide different levels of authorization for the at least one resource.

18. The system of claim 14, wherein the memory further includes instructions that, when executed by the processor, cause the system to:
send information including the anticipated usage value to an authorized user of the at least one resource; and
enable the authorized user to call into the control environment to request for the adjustment of the capacity of the at least one resource.

19. A computer program product embedded in a non-transitory computer-readable storage medium and including instructions that, when executed by at least one computing device, cause the at least one computing device to:
obtain performance information for at least one resource of a database in a data environment, the performance information including at least one of usage information or capacity information for the at least one resource, the at least one resource including a logical device corresponding to one or more physical devices;

extract historical information for the at least one resource, the historical information representing values of at least some of the performance information over a period of time;

analyze the performance information and the historical information using at least one prediction algorithm to predict that an anticipated usage value for the at least one resource will fall outside of at least one specified range within at least one specified time period;

select a scaling action, from among a plurality of scaling options, for adjustment of a capacity of the at least one resource, the adjustment being based at least in part upon the anticipated usage value, selection of the scaling action being based at least in part upon a respective cost corresponding to each of the plurality of scaling actions;

determine whether authorization is granted for the scaling option based at least in part upon the cost corresponding to the scaling option; and execute a workflow in a control environment for the adjustment of the capacity of the at least one resource in the data environment based at least in part upon the scaling option in response to a determination that the authorization is granted, the adjustment including: (a) a changing of a number of the one or more physical devices that collectively provide the capacity for the logical device and (b) a balancing of input output performance among the one or more physical devices.

20. The computer program product embedded in the non-transitory storage medium of claim 19, wherein:
the at least one resource includes at least one of a processing component, a data storage component, a memory component, a communications component, a network I/O component, or a data I/O component.

21. The computer program product embedded in the non-transitory storage medium of claim 19, further including instructions that, when executed by at least one computing device, cause the at least one computing device to:
when the determination is that the authorization is not granted, contact a user for the authorization before executing the workflow.

22. The computer program product embedded in the non-transitory storage medium of claim 19, further including instructions that, when executed by at least one computing device, cause the at least one computing device to:
enable a user to provide different levels of authorization for the at least one resource.

23. The computer program product embedded in the non-transitory storage medium of claim 19, further including instructions that, when executed by at least one computing device, cause the at least one computing device to:
send information including the anticipated usage value to an authorized user of the at least one resource; and
enable the authorized user to call into the control environment to request for the adjustment of the capacity of the at least one resource.

* * * * *